(12) United States Patent
Krekel et al.

(10) Patent No.: US 11,845,334 B2
(45) Date of Patent: Dec. 19, 2023

(54) METHOD AND APPARATUS FOR CONTROLLING A LOCKING SYSTEM OF A MOTOR VEHICLE COMPRISING A DEVICE FOR PARTIALLY AUTONOMOUS PARKING

(71) Applicant: Ford Global Technologies, LLC, Dearborn, MI (US)

(72) Inventors: Markus Krekel, Wermelskirchen (DE); Florian Vieten, Meerbusch (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/937,682

(22) Filed: Oct. 3, 2022

(65) Prior Publication Data
US 2023/0107437 A1  Apr. 6, 2023

(30) Foreign Application Priority Data
Oct. 4, 2021  (DE) .......................... 102021125649.6

(51) Int. Cl.
*B60K 28/04* (2006.01)
*B60R 25/04* (2013.01)
(Continued)

(52) U.S. Cl.
CPC .............. *B60K 28/04* (2013.01); *B60R 25/04* (2013.01); *B60R 25/24* (2013.01); *B60R 25/33* (2013.01);
(Continued)

(58) Field of Classification Search
CPC .. B60K 28/04; B60K 2028/003; B60R 25/04; B60R 25/24; B60R 25/33; B60W 30/06;
(Continued)

(56) References Cited

U.S. PATENT DOCUMENTS

2013/0110374 A1* 5/2013 Boesch ............... F02N 11/0837
701/102
2013/0158838 A1* 6/2013 Yorke ............. B60W 30/18018
701/123
(Continued)

FOREIGN PATENT DOCUMENTS

DE    102013003058 A1    8/2014
DE    102015201997 A1    8/2015
(Continued)

OTHER PUBLICATIONS

English translation of Huang WO 2018/227528 (Year: 2018).*

*Primary Examiner* — Joseph J Dallo
(74) *Attorney, Agent, or Firm* — Frank Lollo; Eversheds Sutherland (US) LLP

(57) ABSTRACT

A method for controlling a locking system for automatic locking and shutdown of a motor vehicle comprising a device for partially autonomous parking is described. The method comprises the following steps: receiving a request for automatic locking and shutdown of the motor vehicle; determining at least one feature which identifies an imminent use of the function for partially autonomous parking; evaluating the at least one feature captured and on the basis thereof determining whether a use of the function for partially autonomous parking is to be expected; delaying the automatic shutdown of the motor vehicle if it was determined that a use of the function for partially autonomous parking is to be expected.

17 Claims, 7 Drawing Sheets

(51) Int. Cl.
   *B60R 25/24* (2013.01)
   *B60R 25/33* (2013.01)
   *B60W 30/06* (2006.01)
   *G07C 9/00* (2020.01)
   *B60K 28/00* (2006.01)

(52) U.S. Cl.
   CPC ......... *B60W 30/06* (2013.01); *G07C 9/00309* (2013.01); *B60K 2028/003* (2013.01); *G07C 2009/00769* (2013.01); *G07C 2209/08* (2013.01); *G07C 2209/63* (2013.01)

(58) Field of Classification Search
   CPC ...... G07C 9/00309; G07C 2009/00769; G07C 2209/08; G07C 2209/63; G07C 2009/00507
   See application file for complete search history.

(56) References Cited

U.S. PATENT DOCUMENTS

2017/0320466 A1* 11/2017 Nordbruch ......... G07C 9/00571
2018/0274665 A1*  9/2018 Botella ................... F16H 63/42

FOREIGN PATENT DOCUMENTS

| DE | 102019114813 A1 | 12/2019 | |
| WO | WO-2018227528 A1 * | 12/2018 | |
| WO | WO-2018232942 A1 * | 12/2018 | ............. G06Q 10/02 |

* cited by examiner

METHOD AND APPARATUS FOR
CONTROLLING A LOCKING SYSTEM OF A
MOTOR VEHICLE COMPRISING A DEVICE
FOR PARTIALLY AUTONOMOUS PARKING

CROSS-REFERENCE TO RELATED PATENT APPLICATION

The present application claims priority to and the benefit of German Application No. DE 102021125649.6, filed Oct. 4, 2021, which is hereby incorporated by reference herein its entirety

FIELD OF THE INVENTION

The present disclosure relates to a method for controlling a locking system for automatic locking and shutdown of a motor vehicle comprising a device for partially autonomous parking.

BACKGROUND

Modern motor vehicles usually have a device for partially autonomous parking or a corresponding function for partially autonomously parking in a parking space and leaving same. As delimitation from a device for autonomous parking or fully/partially autonomous parking, the operation of which does not require a user or a remote control unit to be situated in the vicinity of the motor vehicle, for example less than 6 meters away, a device for partially autonomous parking is understood to mean a fully automated parking assistant including a remote control unit. Therefore, for operation, the remote control unit has to be situated at a distance which is less than a defined maximum distance. In the case of motor vehicles comprising locking systems without traditional keys and with a function for automatic locking and shutdown of the motor vehicle (ASF—automatic locking and shutdown feature), a conflict can occur between the function for automatic locking and shutdown and the function for partially autonomous parking. Typically, in the context of the function for automatic locking and shutdown of the motor vehicle, data that are required in the context of the function for partially autonomous parking are erased or no longer available. Therefore, if a user leaves the motor vehicle with the intention of using the function for automatic parking after the motor vehicle has been locked, data such as, for example, maps of objects and available parking spaces may possibly be erased as a result of shutdown of the motor vehicle. It is necessary for the data to be erased since, once the motor vehicle has been shut down and the sensors are not in operation anymore, it is not possible to ensure any longer that the information about the surroundings is still valid when the vehicle is switched on once more or again. Besides the erasure of data, shutdown of sensors and controllers during the locking process is also disadvantageous if the intention is for partially autonomous parking still to be effected afterward.

The document DE 10 2013 003 058 A1 describes automatic shutdown of the ignition by a control device in the absence of the driver. The document DE 10 2015 201 997 A1 describes a vehicle comprising a parking assistance system in which a processing device initiates a shutdown sequence if there are no passengers in the vehicle. The shutdown sequence comprises commanding the parking assistance system to park the vehicle, and shutting down the engine after the vehicle has been parked. The document DE 10 2019 114 813 A1 discloses a hybrid electric vehicle comprising a parking assistant. In that case, a controller restarts the internal combustion engine upon activation of the automatic parking function in a situation in which the normal internal combustion engine starting controller would have started the internal combustion engine during the parking maneuver.

DETAILED DESCRIPTION

Figure 1:
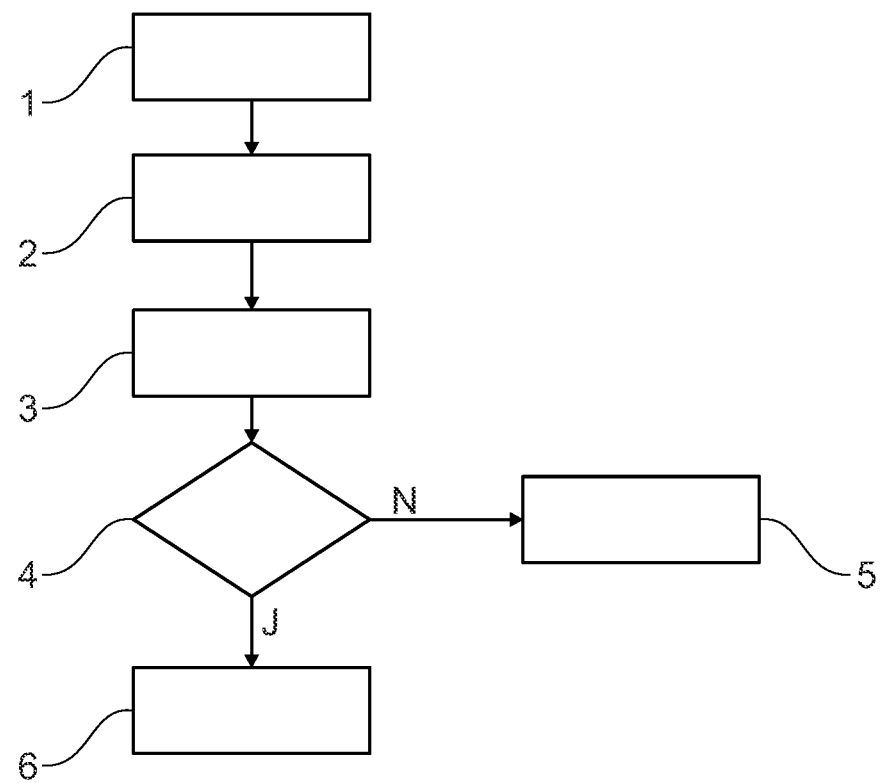
FIG. 1 schematically shows a method according to the disclosure in the form of a flow diagram.

Against the background described, it is an object of the present disclosure to provide an improved method for controlling a locking system for automatic locking and shutdown of a motor vehicle comprising a device for partially autonomous parking. Further objects are to provide a correspondingly advantageous control apparatus for a locking system for automatic locking and shutdown of a motor vehicle, a locking system, a motor vehicle, a computer-implemented method, a computer program product, a computer-readable data carrier and a data carrier signal.

These objects are achieved by means of a method for controlling a locking system, a control apparatus for a locking system, a locking system, a motor vehicle, a computer-implemented method, a computer program product, and a data carrier signal, as claimed.

A method according to the disclosure for controlling a locking system for automatic locking and shutdown of a motor vehicle relates to a motor vehicle comprising a device for partially autonomous parking. The method comprises the following steps: a request, for example from a user, for automatic locking and shutdown of the motor vehicle is received. In a further step, at least one feature which identifies an imminent use of the function for partially autonomous parking is determined, for example captured, in particular detected. The feature can be for example a parameter, a variable, information from user data or other data. In a next step, the at least one feature captured is evaluated and on the basis thereof it is determined whether a use of the function for partially autonomous parking is to be expected. That is to say, in other words, the at least one feature captured is taken as a basis for determining whether a use of the function for partially autonomous parking is to be expected.

In a further step, the automatic shutdown of the motor vehicle is delayed if it was determined that a use of the function for partially autonomous parking is to be expected. Optionally, the motor vehicle can be locked in the context of the method, in particular before or after the delaying of shutdown or during the delaying of shutdown. The method according to the disclosure has an advantage that the disadvantages described in the introduction concerning a possible conflict between automatic locking and shutdown of the motor vehicle and a function for partially autonomous parking are avoided as a result of a delay of the shutdown in relation to the locking of the motor vehicle.

In one advantageous variant, receiving a request for automatic locking and shutdown of the motor vehicle is effected by means of a key for operating the motor vehicle. In association with the present disclosure, a key is understood to be a means for authorizing a user or for proving the authorization of a user to operate the motor vehicle. This need not necessarily be a physical key. It can also be a smartphone, a smart watch, etc.

The delaying can be effected at the most until a timed time duration has elapsed since receiving the request for automatic locking and shutdown of the motor vehicle. It can thus be limited temporally. By way of example, a time switch or a timer can be used for this purpose. In addition or as an alternative thereto, the distance between a key for operating the motor vehicle and the motor vehicle can be captured and the delaying can be effected at the most until a defined maximum distance between the key for operating the motor vehicle and the motor vehicle has been reached. The variants described ensure that the motor vehicle does not remain switched on and/or unlocked in an unlimited manner, that is to say, in other words, that the implementation of the request for automatic locking and shutdown of the motor vehicle is ensured.

The at least one feature can be determined, in particular captured, in a defined time interval, for example at a defined point in time, within which a user leaves the motor vehicle. This ensures that the at least one feature is determined only directly in connection with a user leaving the motor vehicle, in particular after that, and, consequently, computing power and possibly sensors are not employed unnecessarily.

The at least one feature can be the current position of the motor vehicle, for example in relation to the surroundings of the motor vehicle, and/or at least one feature of the surroundings of the motor vehicle and/or a received user request or user input (e.g., via the HMI in the vehicle) and/or captured behavior of a user and/or a captured presence of at least one user in the motor vehicle and/or the distance between a key and the motor vehicle. The features mentioned are suitable for determining on the basis thereof, in the context of the evaluation, whether a use of the function for partially autonomous parking is to be expected. If the fact that the user has just parked the motor vehicle, in particular manually or partially autonomously or using a parking assistance function is captured, for example, then it is likely that a use of the function for partially autonomous parking is not expected.

In particular, the current position of the motor vehicle can be determined, in particular captured, on the basis of geographical data and/or on the basis of data of a navigation system, for example on the basis of an input of a destination by a user. As at least one feature of the surroundings of the vehicle the type of roadway can be determined, in particular captured. By way of example, the fact that the roadway is a parking space or a roadway within a village or town or a country road or an expressway or an interstate highway, etc., can be determined. Depending on that it is possible to determine whether a user of the function for partially autonomous parking is to be expected. The probability of that is higher in the case of a parking space, for example, than in the case of an interstate highway.

In addition or as an alternative thereto, as a feature of the surroundings of the motor vehicle the presence of occupied and/or all free parking spaces and/or objects and/or parking vehicles and/or buildings can be determined, in particular captured. Furthermore, in addition or as an alternative thereto, an assignment of the surroundings of the motor vehicle to an activity of a user can be determined. For example, it is possible to determine whether the current surroundings of the motor vehicle were used in the past for a specific activity of the user, for example for dwelling, working, doing sport or a hobby, and can therefore be assigned to a corresponding activity. If this is the case, then this assignment can be used for example to determine whether a use of the function for partially autonomous parking is to be expected. For this purpose, in particular, the user's data available, for example stored, in association with mobile devices can be evaluated.

In the context of determining and evaluating captured behavior of the user, it is possible—as already mentioned—for example to evaluate whether the user has parked the motor vehicle within a defined preceding time interval, for example using a parking assistant. Furthermore, the behavior can be evaluated in respect of whether the user, after leaving the motor vehicle, moves away from it, stays in its vicinity, and/or in what time periods this behavior took place.

The variants described above make it possible, in the context of a corresponding evaluation of the features respectively determined or captured, to determine whether a use of the function for partially autonomous parking is to be expected.

The control apparatus according to the disclosure for a locking system for automatic locking and shutdown of a motor vehicle comprising a device for partially autonomous parking is distinguished by the fact that it comprises a device for receiving a request, for example from a user, for automatic locking and shutdown of the motor vehicle, a device for determining, in particular for capturing, for example for detecting, at least one feature which identifies an imminent use of the function for partially autonomous parking, and an evaluation device. The control apparatus is designed to carry out a method according to the disclosure described above. The control apparatus according to the disclosure has the features and advantages already described in association with the method according to the disclosure.

The locking system according to the disclosure for automatic locking and shutdown of a motor vehicle comprising a device for partially autonomous parking comprises a control apparatus according to the disclosure described above. The motor vehicle according to the disclosure comprises a device for partially autonomous parking and a locking system according to the disclosure described above. The locking system according to the disclosure and the motor vehicle according to the disclosure have the features and advantages already mentioned.

The computer-implemented method according to the disclosure comprises instructions which, when the program is executed by a computer, cause the latter to carry out a method according to the disclosure described above. The computer program product according to the disclosure comprises instructions which, when the program is executed by a computer, cause the latter to carry out a method according to the disclosure described above. The computer program product according to the disclosure is stored on the computer-readable data carrier according to the disclosure. The data carrier signal according to the disclosure transmits the computer program product according to the disclosure. The computer-implemented method according to the disclosure, the computer program product according to the disclosure, the computer-readable data carrier according to the disclosure and the data carrier signal according to the disclosure have the features and advantages already mentioned above.

The disclosure is explained in greater detail below on the basis of exemplary embodiments with reference to the accompanying figures. Although the disclosure is more specifically illustrated and described in detail by means of the preferred exemplary embodiments, nevertheless the disclosure is not restricted by the examples disclosed and other variations can be derived therefrom by the person skilled in the art, without departing from the scope of protection of the disclosure.

The figures are not necessarily accurate in every detail and true to scale and may be illustrated in an enlarged or reduced size in order to afford a better overview. Therefore, functional details disclosed here should not be understood to be restrictive, but rather merely as an illustrative basis which offers the person skilled in the art in this technological field instructions for using the present disclosure in diverse ways.

The expression "and/or" used here, if it is employed in a series of two or more elements, means that each of the elements presented can be used by itself, or any combination of two or more of the elements presented can be used. By way of example, if a composition is described which contains the components A, B and/or C, the composition can contain A by itself; B by itself; C by itself; A and B in combination; A and C in combination; B and C in combination; or A, B, and C in combination.

The disclosure furthermore relates to a control apparatus for a locking system, to a locking system for automatic locking and shutdown of a motor vehicle comprising a device for partially autonomous parking, and also to a motor vehicle. Furthermore, the disclosure relates to a computer-implemented method, to a computer program product, to a computer-readable data carrier and to a data carrier signal.

FIG. 1 schematically shows a method according to the disclosure in the form of a flow diagram. In the context of the method shown for controlling a locking system for automatic locking and shutdown of a motor vehicle comprising a device for partially autonomous parking, a first step 1 comprises receiving a request for automatic locking and shutdown of the motor vehicle. Receiving a request for automatic locking and shutdown of the motor vehicle can be effected by means of a key for operating the motor vehicle.

Step 2 involves determining, for example capturing, at least one feature which identifies an imminent use of the function for partially autonomous parking. Step 3 involves evaluating the at least one feature captured. On the basis of the evaluation, step 4 involves checking whether a use of the function for partially autonomous parking is to be expected or such a use is imminent. If this is not the case, then step 5 involves carrying out the automatic locking and shutdown of the motor vehicle in accordance with the received request.

If a use of the function for partially autonomous parking is to be expected, then step 6 involves delaying the automatic shutdown of the motor vehicle. Optionally, the motor vehicle can be locked in step 6, in particular before or after the delaying of shutdown or during the delaying of shutdown.

The delaying can be effected at the most until a timed time duration has elapsed since receiving the request for automatic locking and shutdown of the motor vehicle, that is to say can be limited temporally. In addition or as an alternative thereto, the distance between a key for operating the motor vehicle and the motor vehicle can be captured and the delaying can be effected at the most until a defined maximum distance between the key for operating the motor vehicle and the motor vehicle has been reached. In this variant, therefore, the maximum delay depends on the spatial distance between the user carrying the key and the motor vehicle.

Concrete examples for implementing steps 2-4 are explained in greater detail below with reference to FIGS. 2 to 6. FIGS. 2 to 6 each show a roadway 22 and an ego motor vehicle 20 situated thereon. Further motor vehicles are identified by the reference number 23. The ego motor vehicle 20 is a motor vehicle according to the disclosure which comprises a device for partially autonomous parking 16 and a locking system 15 according to the disclosure.

Figure 2:
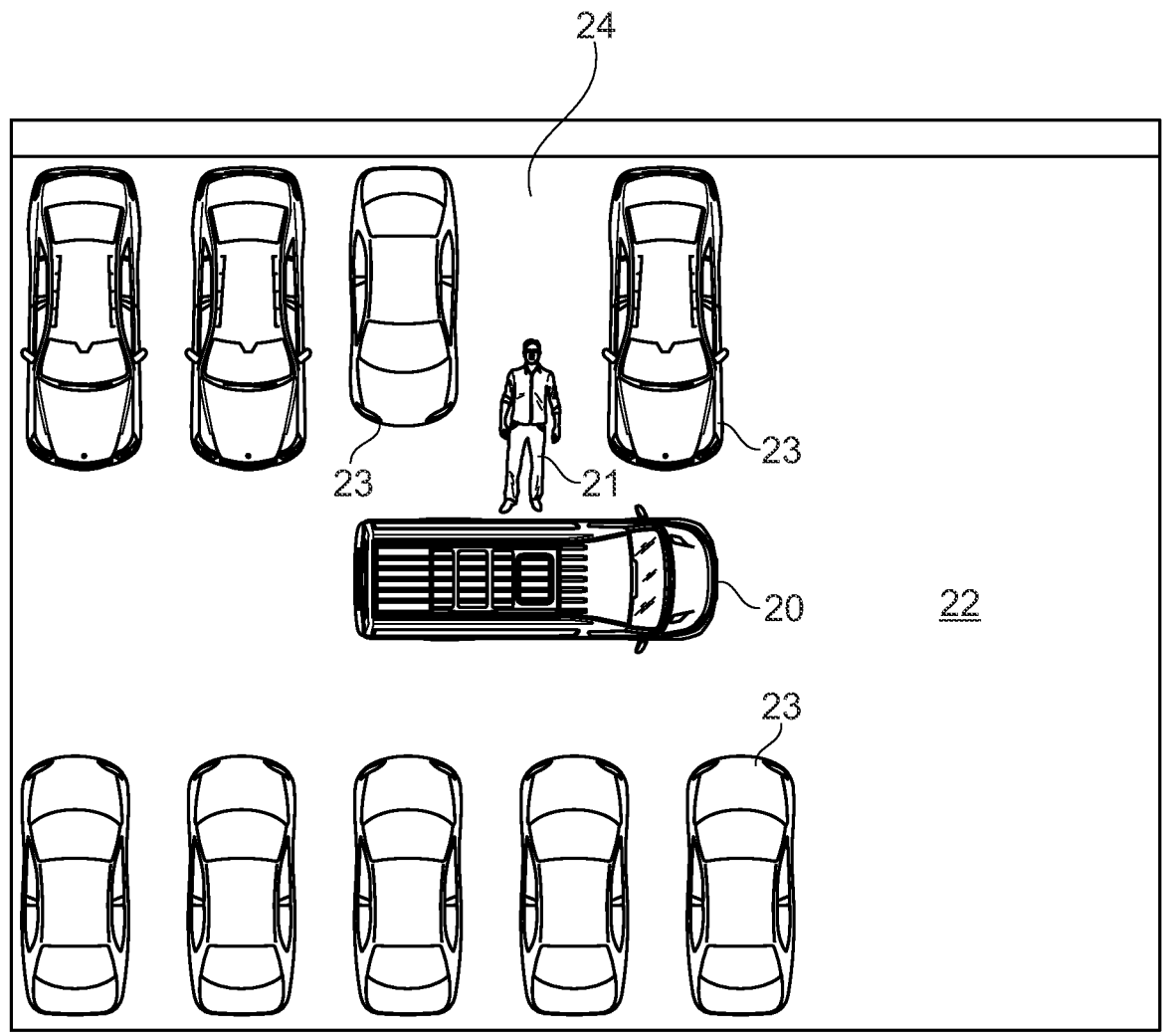
FIGS. 2-6 schematically show scenarios and embodiment variants for determining and evaluating at least one feature which identifies an imminent use of the function for partially autonomous parking.

In the example shown in FIG. 2, the surroundings of the motor vehicle 20 are captured by means of a sensor, a number of parked motor vehicles 23 being detected. Furthermore, the fact that the roadway 20 is a road with parking possibilities can be determined from geographical data in relation to the surroundings of the vehicle. Furthermore, the fact that a user 21 has stopped the motor vehicle 20 perpendicularly in front of a free parking space 24 situated for perpendicular parking and has left the motor vehicle can be determined by means of vehicle-internal sensors. The geographical data and the data determined by the sensors of the motor vehicle reveal that the motor vehicle 20 is situated in front of a free parking space. In the example shown, the geographical position of the motor vehicle on a roadway with a parking possibility and the stopping of the motor vehicle directly in front of a free parking space and the user's behavior in the form of leaving the motor vehicle after stopping same were determined as features identifying an imminent use of the function for partially autonomous parking. In the context of the evaluation of these features, the fact that a use of the function for partially autonomous parking is to be expected is determined in this example. A signal which prevents the automatic shutdown of the motor vehicle and only allows the automatic locking of the motor vehicle is therefore output to the controller of the locking system. The position of the user is monitored and a timer is started. The motor vehicle is shut down when a defined distance between the user and the motor vehicle 20 is exceeded and/or after the time duration set by means of the timer has elapsed.

Figure 3:
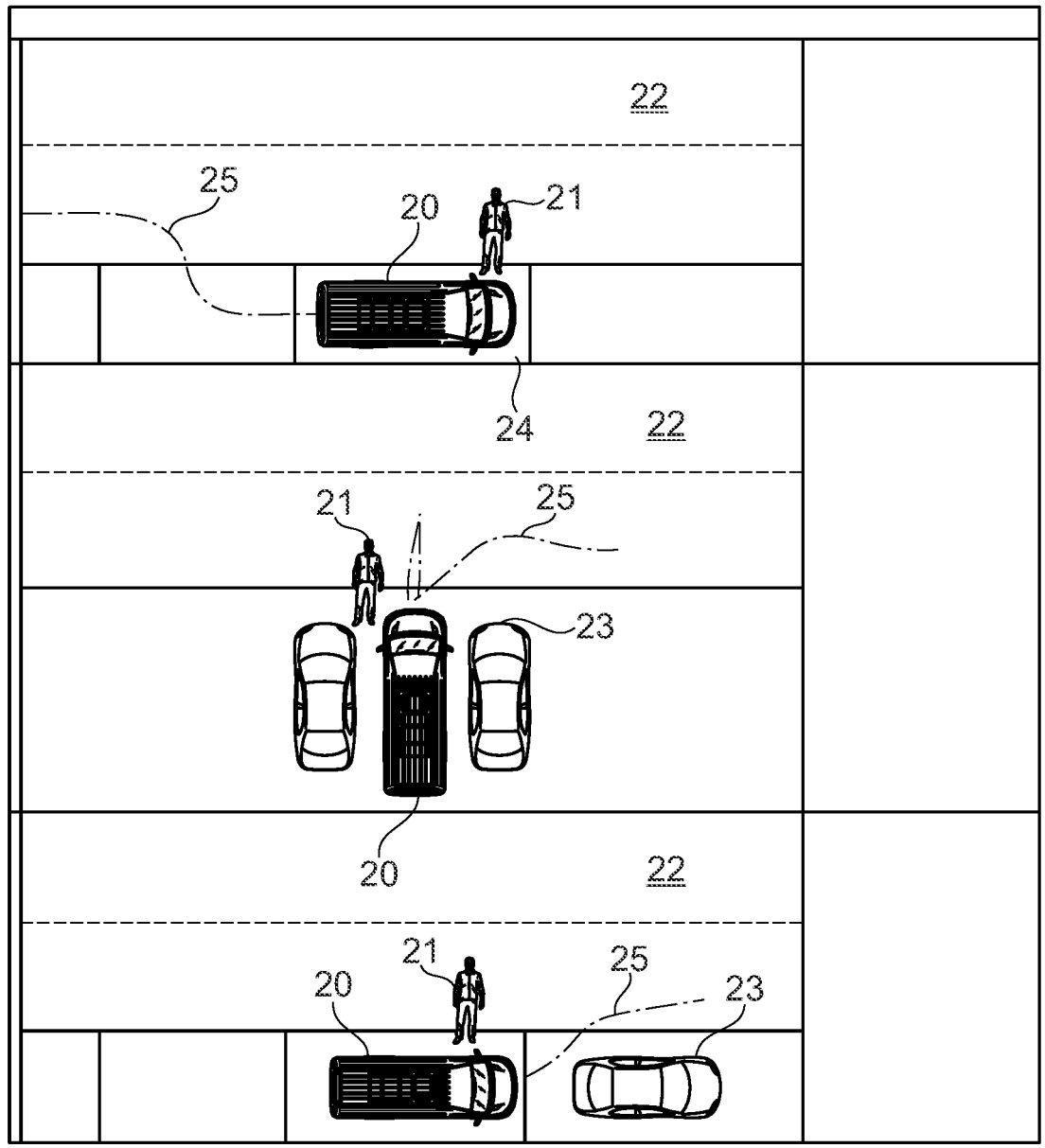

In the three examples shown in FIG. 3, a user has already manually parked the motor vehicle 20. The associated trajectories are identified by the reference numeral 25. In the variant shown at the top in FIG. 3, this involved parking in a parking space 24, the surrounding parking spaces also being free. In the variant shown in the middle, the user 21 has manually parked the motor vehicle 20 perpendicularly between two motor vehicles 23. In the variant shown at the bottom in FIG. 3, the user 21 has parked the motor vehicle 20 behind an already parked motor vehicle 23. In the context of the method according to the disclosure, the parking behavior of the user 21 is captured in association with determining at least one feature. In the context of evaluating the captured parking process, in particular the associated trajectories 25 and the surrounding motor vehicles 23, it is ascertained that the motor vehicle 20 has already been parked and, therefore, a use of the function for partially autonomous parking is not to be expected. In this case, the function for automatic locking and shutdown of the motor vehicle is implemented directly in accordance with the requirement that is to say without a delay. In association with the examples shown in FIG. 3, a use of a parking assistant, in particular of a partially or fully automated parking assistant, during the operation of which the driver remains in the vehicle, by the user 21 can also be captured and the fact that a use of the function for partially autonomous parking is not to be expected can be derived from this.

Figure 4:
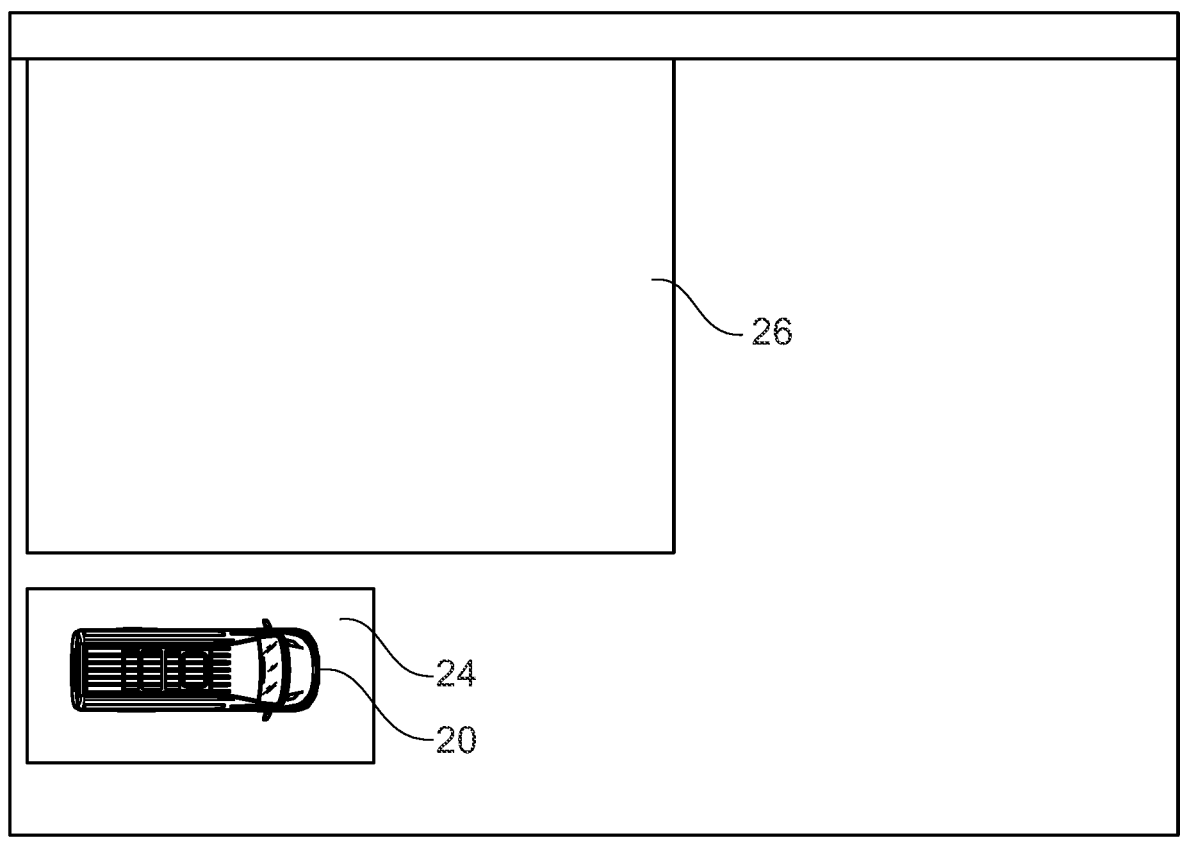

In the variant shown in FIG. 4, a user has stopped the motor vehicle 20 in front of an already known geographical location 26, for example in front a building. In this case, a possible assignment of the location 26, for example the building, to past behavior of the user 21 can be effected in the context of determining a feature. For example, it may be recognized that the user 21 has already parked in front of this location once before in the past or that the building is the workplace or the dwelling of the user 21 or a supermarket, etc. From the captured data, the fact that a use of the function for automatic parking is not to be expected can be derived in the context of the evaluation.

Figure 5:
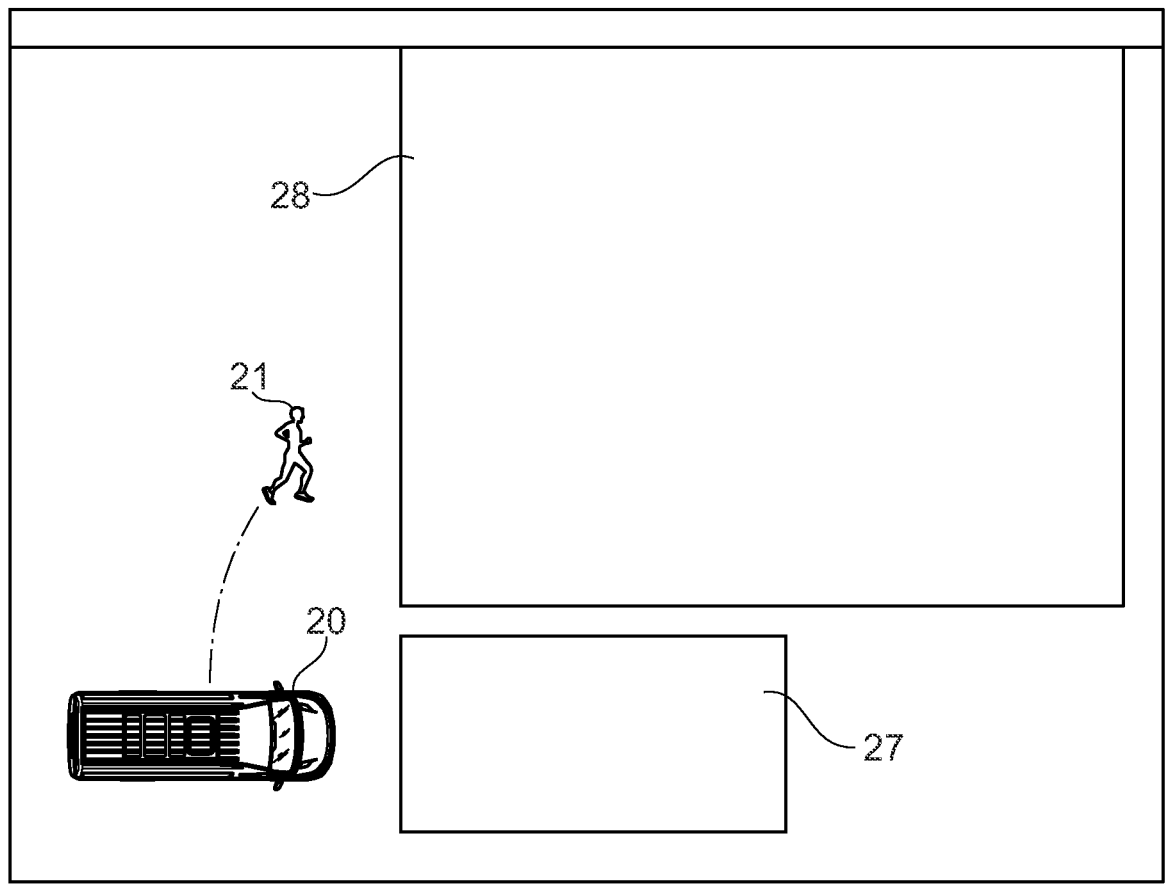

In the variant shown in FIG. 5, the user 21 has parked the motor vehicle 20 in front of a garage 27 next to his/her residence 28. In this case, the geographical position of the motor vehicle 20 directly in front of the garage 27 and next to the residence 28 can be captured as a feature identifying an imminent use of the function for partially autonomous parking. The fact that a use of the function for partially autonomous parking is to be expected is derived from this. Therefore, before the motor vehicle 20 is shut down, firstly a timer with a defined time duration is started. Furthermore, the spatial distance between the user 21 and the motor vehicle 20 is detected. If the defined time duration has elapsed or the distance between the user 21 and the motor vehicle 20 exceeds a defined maximum distance, the motor vehicle 20 is shut down.

Figure 6:
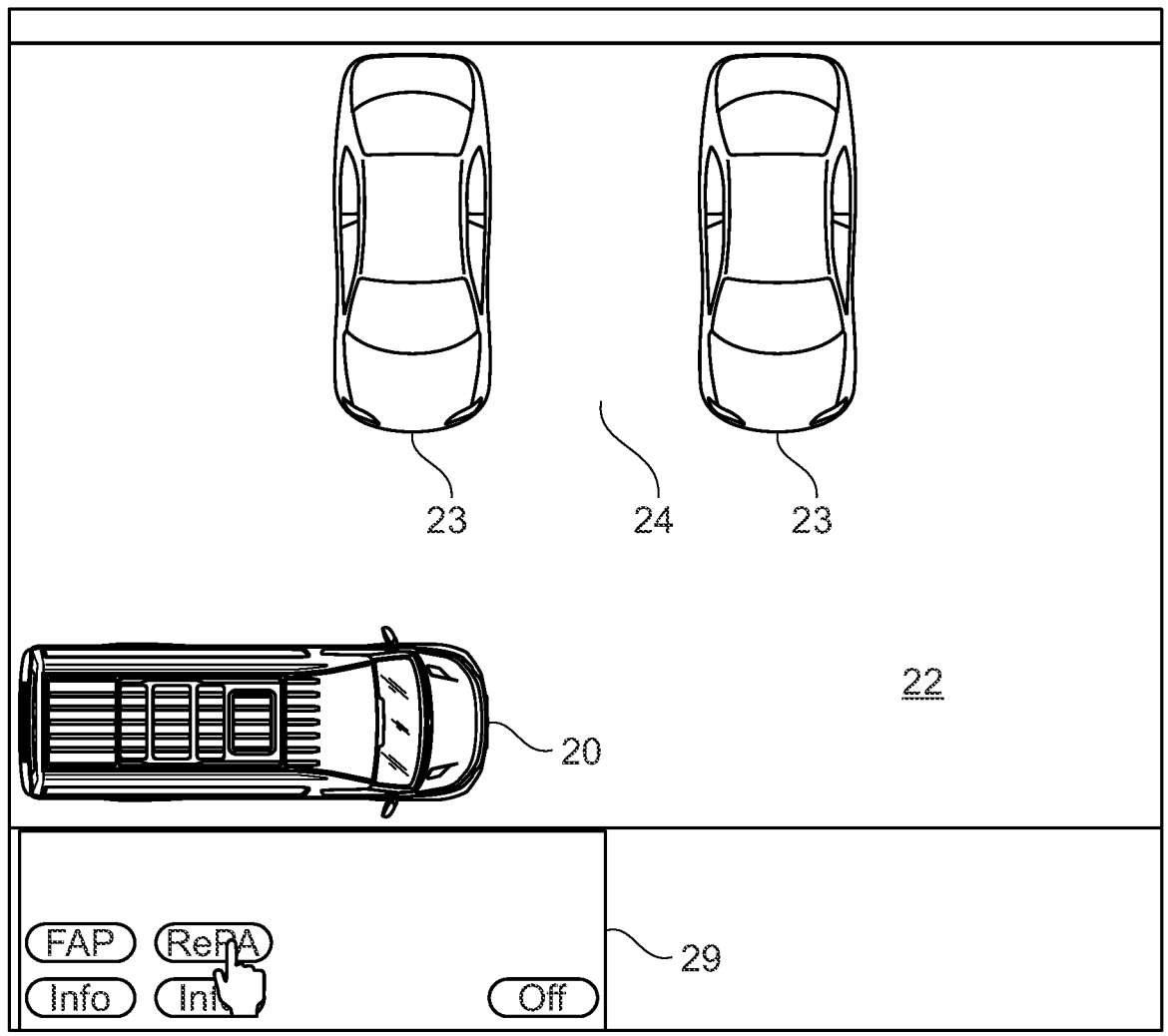

In the variant shown in FIG. 6, the motor vehicle 20 was stopped in direct proximity to a free parking space 24 between two motor vehicles 23. Via a user input, for example a human-machine interface (HMI) 29, the user can effect an input to the control apparatus that the function for automatic parking is intended to be used. The input can also be effected as voice input, by pressing a button or in some other way. In this way, the automatic shutdown of the motor vehicle is delayed in relation to the locking of the motor vehicle.

Figure 7:
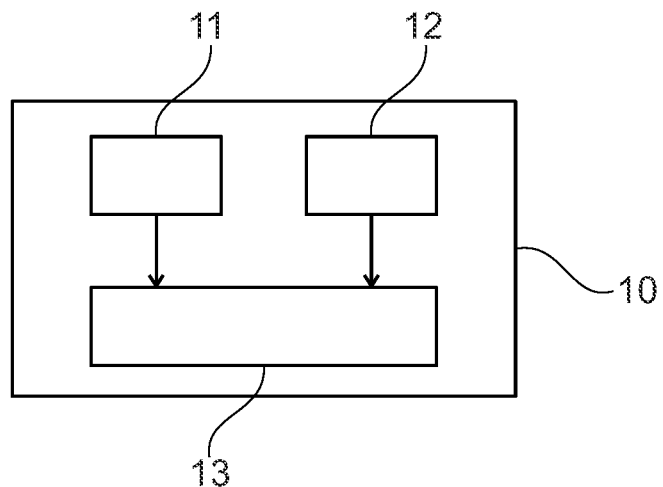
FIG. 7 schematically shows a control apparatus according to the disclosure in the form of a block diagram.

FIG. 7 shows a control apparatus 10 according to the disclosure for a locking system for automatic locking and shutdown of a motor vehicle comprising a device for partially autonomous parking. The control apparatus 10 comprises a device 11 for receiving a request for automatic locking and shutdown of the motor vehicle, a device 12 for determining at least one feature which identifies an imminent use of the function for partially autonomous parking, and an evaluation device 13. The evaluation device 13 is designed to carry out a method according to the disclosure, for example a method described with reference to FIGS. 1 to 6. The control apparatus 10 can include computer hardware, processor, memory and/or software components for implementing these described tasks and functions. For instance, a processor may execute software to provide the described tasks and functions described herein.

Figure 8:
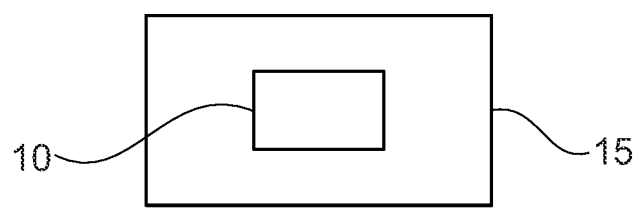
FIG. 8 schematically shows a locking system according to the disclosure in the form of a block diagram.

FIG. 8 schematically shows a locking system 15 according to the disclosure for automatic locking and shutdown of a motor vehicle comprising a device for partially autonomous parking. The locking system 15 comprises a control apparatus 10 according to the disclosure, preferably a control apparatus as described with reference to FIG. 7.

Figure 9:
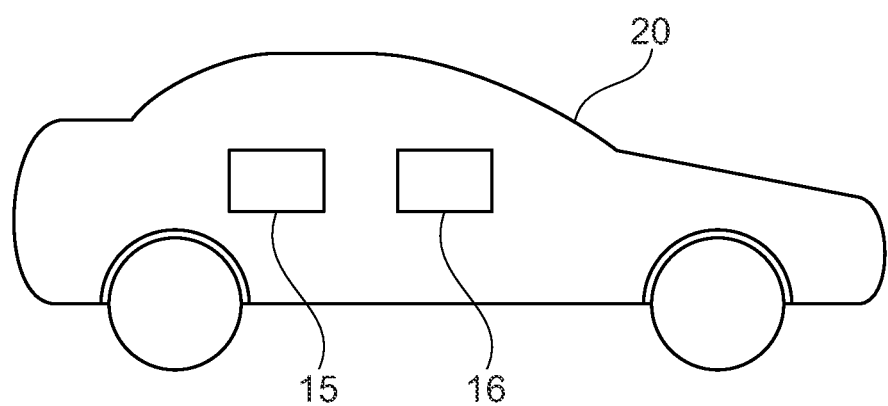
FIG. 9 schematically shows a motor vehicle according to the disclosure.

FIG. 9 schematically shows a motor vehicle 20 according to the disclosure. The motor vehicle 20 according to the disclosure comprises a device for partially autonomous parking 16 and a locking system 15 according to the disclosure, for example a locking system 15 described with reference to FIG. 8. The motor vehicle 20 can be for example a car, a truck, a bus, a minibus, etc.

LIST OF REFERENCE SIGNS

1 Receiving a request for automatic locking and shutdown of the motor vehicle
2 Determining at least one feature which identifies an imminent use of the function for partially autonomous parking
3 Evaluating the at least one feature captured
4 Is a use of the function for partially autonomous parking to be expected?
5 Locking and shutdown of the motor vehicle in accordance with the received request
6 Delaying the shutdown of the motor vehicle
10 Control apparatus
11 Device for receiving a request for automatic locking and shutdown of the motor vehicle
12 Device for determining at least one feature which identifies an imminent use of the function for partially autonomous parking
13 Evaluation device
15 Locking system
16 Device for partially autonomous parking
20 Motor vehicle
21 User
22 Roadway
23 Motor vehicle
24 Parking space
25 Trajectory
26 Geographical location
27 Garage
28 Residence
29 Human-machine interface
Y Yes
N No It is claimed:

1. A method for controlling a locking system for automatic locking and shutdown of a motor vehicle comprising a device for partially autonomous parking, the method comprising the following steps:
   receiving a request for automatic locking and shutdown of the motor vehicle;
   determining at least one feature which identifies an imminent use of the function for partially autonomous parking;
   evaluating the at least one feature captured and on the basis thereof determining whether a use of the function for partially autonomous parking is to be expected; and
   delaying the automatic shutdown of the motor vehicle if it was determined that a use of the function for partially autonomous parking is to be expected.

2. The method according to claim 1, wherein receiving a request for automatic locking and shutdown of the motor vehicle is effected by a key for operating the motor vehicle.

3. The method according to claim 1, wherein delaying is effected at the most until a timed time duration has elapsed since receiving the request for automatic locking and shutdown of the motor vehicle.

4. The method according to claim 1, wherein a distance between a key for operating the motor vehicle and the motor vehicle is captured and the delaying is effected at the most until a defined maximum distance between the key for operating the motor vehicle and the motor vehicle has been reached.

5. The method according to claim 1, wherein the at least one feature is determined in a defined time interval within which a user leaves the motor vehicle.

6. The method according to claim 1, wherein the at least one feature is a current position of the motor vehicle and/or at least one feature of a surroundings of the motor vehicle and/or a received user request and/or captured behavior of a user and/or the captured presence of at least one user in the motor vehicle and/or the distance between the key and the motor vehicle.

7. The method according to claim 6, wherein the current position of the motor vehicle is determined on the basis of geographical data and/or on the basis of data of a navigation system.

8. The method according to claim 6, wherein at least one feature of the surroundings of the motor vehicle, the type of roadway and/or occupied parking spaces and/or free parking spaces and/or objects and/or parking vehicles and/or buildings are captured and/or an assignment of the surroundings of the motor vehicle to an activity of a user is determined.

9. A motor vehicle comprising a control apparatus for a locking system for automatic locking and shutdown of a motor vehicle comprising a device for partially autonomous parking, the control apparatus comprises:
- a device for receiving a request for automatic locking and shutdown of the motor vehicle;
- a device for determining at least one feature which identifies an imminent use of the function for partially autonomous parking; and
- an evaluation device that evaluates the at least one feature captured, and determines that a use of the function for partially autonomous parking is to be expected, wherein the control apparatus determines to delay the automatic shutdown of the motor vehicle based on the determination that a use of the function for partially autonomous parking is to be expected.

10. A computer-implemented method for automatic locking and shutdown of a motor vehicle comprising a device for partially autonomous parking, comprising instructions which, when executed by a computer of the motor vehicle, cause the computer to perform the following steps:
- receive a request for automatic locking and shutdown of the motor vehicle;
- determine at least one feature which identifies an imminent use of the function for partially autonomous parking;
- evaluate the at least one feature captured and on the basis thereof determining whether a use of the function for partially autonomous parking is to be expected; and
- delay the automatic shutdown of the motor vehicle if it was determined that a use of the function for partially autonomous parking is to be expected.

11. The computer-implemented method of claim 10, wherein to receive a request for automatic locking and shutdown of the motor vehicle is effected by a key for operating the motor vehicle.

12. The computer-implemented method of claim 10, wherein to delay is effected at the most until a timed time duration has elapsed since receiving the request for automatic locking and shutdown of the motor vehicle.

13. The computer-implemented method of claim 10, wherein the distance between a key for operating the motor vehicle and the motor vehicle is captured and to delay is effected at the most until a defined maximum distance between the key for operating the motor vehicle and the motor vehicle has been reached.

14. The computer-implemented method of claim 10, wherein the at least one feature is determined in a defined time interval within which a user leaves the motor vehicle.

15. The computer-implemented method of claim 10, wherein the at least one feature is a current position of the motor vehicle and/or at least one feature of a surroundings of the motor vehicle and/or a received user request and/or captured behavior of a user and/or the captured presence of at least one user in the motor vehicle and/or the distance between the key and the motor vehicle.

16. The computer-implemented method of claim 15, wherein the current position of the motor vehicle is determined on the basis of geographical data and/or on the basis of data of a navigation system.

17. The computer-implemented method of claim 15, wherein at least one feature of the surroundings of the motor vehicle, the type of roadway and/or occupied parking spaces and/or free parking spaces and/or objects and/or parking vehicles and/or buildings are captured and/or an assignment of the surroundings of the motor vehicle to an activity of a user is determined.

* * * * *